Patented Jan. 26, 1960

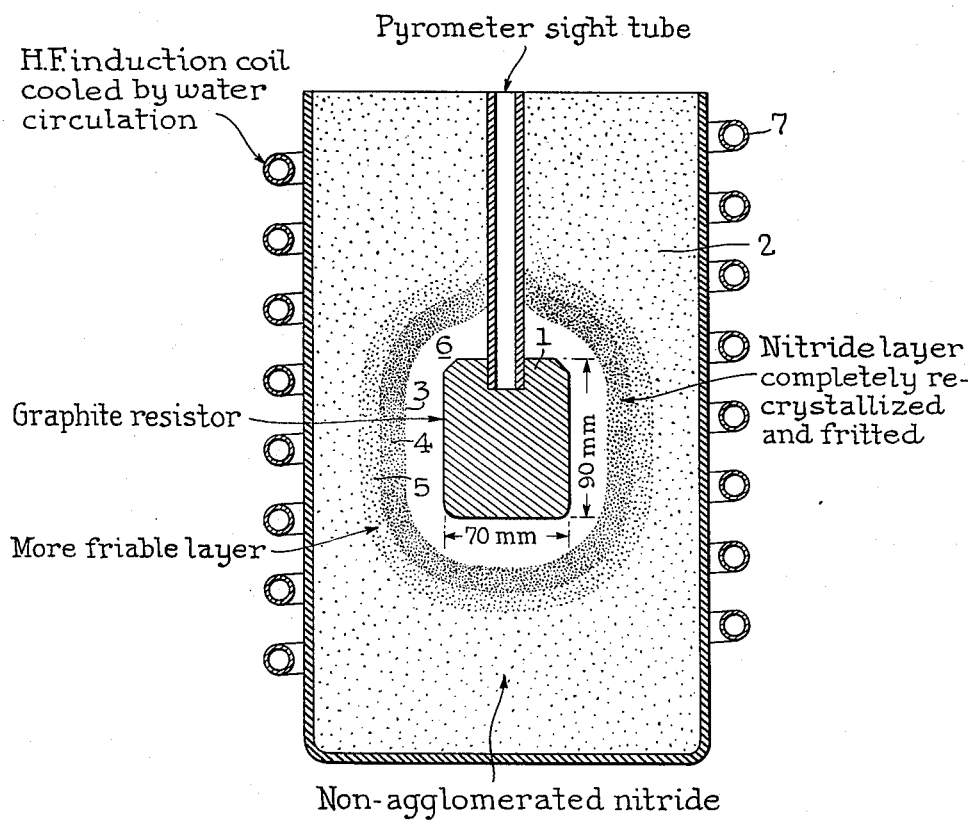

2,922,213

PROCESS FOR AGGLOMERATING ALUMINUM NITRIDE AND RESULTANT PRODUCT

Raymond Bollack and François Mathieu, Grenoble, France, assignors to Pechiney Compagnie de Produits Chimiques et Electrométallurgiques, Paris, France, a corporation of France Application December 23, 1955, Serial No. 555,173

Claims priority, application France January 5, 1955

5 Claims. (Cl. 25—157)

Aluminum nitride is a valuable refractory material. More particularly, it is the only common material that withstands perfectly contact with liquid or gaseous aluminum at high temperature and in a vacuum.

Unfortunately, the manufacture of bricks, shaped articles or crucibles of aluminum nitride is rendered difficult by the fact that sintering begins only at temperatures above 1800° C.; for this reason, it is necessary to use (introduce) a binder which remains stable up to these temperatures and which permits the nitride articles to be baked without deformation, while avoiding introduction of any harmful impurity.

Ordinary binders such as aqueous glues (dextrine, gum arabic) or solutions in a solvent (cellulose-acetate, rubber) are inadequate because, following firing, the skeleton of residual carbon is very rapidly destroyed by reaction with the nitride or with the slight impurities it contains, which impurities are, moreover, unavoidable if slight hydrolysis takes place with an aqueous binder. Sodium silicate only withstands temperatures up to about 1600° C.; above this temperature it reacts with the nitride yielding volatile compounds. Clays not only involve the risk of contaminating the product but, in addition, are reduced by the nitride before the sintering temperature is reached.

The present invention which results from applicants' researches, makes it possible to avoid these drawbacks. It consists in agglomerating the grains of aluminum nitride by forming in situ, in the mass of the refractory body to be obtained, aluminum nitride which acts as a binder.

When it is desired to obtain refractory bodies of enhanced compactness, it is preferable that the nitride grains themselves are constituted of dense units. The aluminum nitride must be of such a granulometry that, following mixing, the voids remaining between the grains are as small as possible.

By way of example and without any limitation of the invention, there are given below two types of granulometry which have been successfully used.

MIXTURE 1

Percent by weight
Grains passing a 25 mesh screen and retained on a 50 mesh screen_____ 20
Grains passing a 50 mesh screen and retained on a 100 mesh screen_____ 15
Grains passing a 100 mesh screen and retained on a 200 mesh screen_____ 7
Grains passing through a 200 mesh screen_____ 58

MIXTURE 2

Grains passing a 10 mesh screen and retained on a 25 mesh screen_____ 26.6
Grains passing a 50 mesh screen and retained on a 100 mesh screen_____ 33.4
Grains passing through a 100 mesh screen_____ 40

In order to fill out the voids more completely, there can be added to Mixture No. 2, 8 to 16% of an aluminum paint pigment or very finely ground aluminum nitride having, for example, only 35% oversize on a 350 mesh screen.

One embodiment of the invention consists in using the property of aluminum nitride of being carried off in the vapor phase at high temperature, and of being deposited in colder zones. A closed vessel is filled, in an atmosphere of nitrogen, with aluminum nitride grains closely packed around a resistor, for example, of graphite, through which is passed an electric current. Within a range of temperature between 2000° and 2250° C., the nitride is transferred a certain distance away from the resistor and recrystallizes again in the mass of nitride grains, which thus become agglomerated.

According to circumstances, the heating may either be stopped when the above range of temperture is reached, and the nitride will then be found to be sintered through a layer of a certain thickness while remaining almost in contact with the resistor; its withdrawal is always very easy. Alternatively, the heating may, on the contrary, be continued whereby a hollow zone forms around the resistor; this zone is surrounded by a wall of dense, well agglomerated aluminum nitride corresponding to the dissociation and sublimation isotherm.

Example 1

Around a cylindrical resistor of graphite, 10 mms. in diameter and 20 cms. long, there is placed a nitride powder comprising:

100 parts by weight of mixture No. 2, and 10 parts of ground nitride (35% oversize on a 350 mesh screen).

A current of 1000 amperes at a voltage of 25 volts is passed through the resistor for 90 seconds. There is obtained thereby a tube of aluminum nitride 20 cms. in length, 15 mms. internal diameter and 30 mms. external diameter. By extending the heating time for an additional 30 seconds, that is 120 seconds altogether, the tube attains a 25 mms. internal and a 40 mms. external diameter, respectively.

Example 2

Around a graphite core 70 mms. in diameter and 90 mms. in length, there is placed a nitride powder which is of the same fineness as the powder of Example 1. The core is heated by induction in a high frequency furnace; after heating for half an hour—the supplied power measured at the alternator being 18 kw.—a temperature of 2200° C. is reached. This temperature is kept up for three-quarters of an hour. This leads to the formation of a sort of "egg" which, when cut, forms a crucible with a smooth and regular internal surface having a diameter of 80 mms. and an internal height of 90 mms.; the thickness of the sintered wall is 20 mms. The walls of this crucible may be made completely impervious by piling inside the crucible and additional amount of nitride grains and carrying out a second heating.

Example 3

The interior of a hollow graphite mold, 50 mms. internal and 70 mms. external diameter and 80 mms. in height, is packed with a nitride showing the granulometry of Mixture No. 2. It is heated for half an hour, with 15 kw. in the same induction furnace as above, thereby reaching a temperature of 2100° C. There is obtained a molding of perfectly sintered nitride, which reproduces accurately the details of the mold. This method makes it especially possible to manufacture crucibles, pipes, and intricate shapes, the removal of which is always easy.

The above described examples of the process of the invention make it possible to obtain relatively dense products, the thermal conductivity of which is, however, too high to permit their use as insulating refractories.

Another embodiment of the invention enables light parts of aluminum nitride to be obtained. It consists in nitriding in a stream of nitrogen, and at a temperature between 1600 and 1800° C., moldings (molded shapes) made of aluminous products and carbonaceous materials.

The shape of the moldings is preserved if the temperatures within the nitriding furnace are uniform; the evolution of carbon monoxide renders the brick very porous; the theoretical ratio of the weight after nitriding to that before nitriding is about 0.6, so that if the density of the initial molding be 1.7, a refractory insulator is obtained having, after nitriding, a density of about 1 and a nitrogen content of 34%.

The method is obviously applicable to the formation in situ within a furnace of a super-refractory insulating lining.

For producing alumina-carbon moldings, cold setting binders will preferably be chosen as facilitating the operation. An artificial cement having a calcium-aluminate base, for example, Secar 250 cement, is very suitable. The contained calcium is at least partially eliminated during baking but, in any event, does not decrease the refractory qualities of the resultant products, because it is transformed into a refractory carbide or carbo-nitride compound.

*Example 4*

Into a parallelepipedal mold there is poured a mixture composed of:

| | Percent |
|---|---|
| Corundum passing through a 100 mesh screen | 60 |
| Metallurgical coke passing through a 50 mesh screen | 30 |
| Calcium aluminate cement | 10 |
| Water in sufficient amount. | |

After being nitrided at 1750° C., the brick becomes very porous, has a light gray color, and contains more than 30% nitrogen; its density is slightly below 1.

*Example 5*

The following mixture is tamped onto a furnace arch:

| | Parts by weight |
|---|---|
| Bayer alumina | 100 |
| Petroleum coke | 10 |
| Pitch | 42 |

This mixture is nitrided in situ, in a stream of nitrogen, by heating it electrically to 1800° C. Following cooling, it is found that the lining is nitrided more than 30%, is light blue in color, and has a density of 0.9.

While applicants do not wish to be limited by any theory of operation, nevertheless, it is their belief that what takes place during the heating of the aluminum nitride at the high temperature (Examples 1, 2, 3) is as follows.

The strong vapor pressure of aluminum nitride causes this compound to volatilize and its vapor to condense within cooler zones producing again crystals of nitride. But, on the other hand, AlN has also a strong dissociation pressure and the formation of nitride crystals by the recombination of its gaseous components is possible within the cooler zones.

Ultimately, the impurities present in the nitride, such as alumina and carbon (the latter can also come from the resistor) causes the formation of sub-compounds, for instance $Al_2O$ and AlCN, which play an important part as recrystallization agents. These sub-compounds are stable only at very high temperatures; for example AlCN forms above 1500° C. through the reaction of AlN with C, and it decomposes back, at lower temperatures, to these two components.

The true mechanism of the agglomeration, which leads to the production of light aluminum nitride bodies (Examples 4 and 5), is not completely known. However it seems that the compounds AlCN and $Al_2O$ take a part therein; within cooler zones $Al_2O$ decomposes to $Al_2O_3$ and Al, the latter being now transformed into nitride. But it seems that alumina and aluminum nitride also recrystallize as new crystalline phases.

The single figure of the annexed diagrammatic drawing will facilitate an understanding of what occurs when operating according to Example 2.

When the resistor 1 is heated by induction by coil 7, a significant temperature gradient is created within the mass of the nitride powder 2; the vapors evolved at 3 progress towards the cooler zones 4 and 5, where they condense to aluminum nitride; the size of the empty space produced at 6 by the volatilization depends upon the power induced in the resistor 1 and upon the duration of the operation.

We claim:

1. Process of agglomerating a mass of aluminum nitride particles comprising the steps of: heating said mass; vaporizing a portion of said particles and condensing the vapors within the remaining unvaporized particles, whereby the condensed vapors act as a binder and agglomerate the mass.

2. Process of agglomerating a mass of aluminum nitride particles comprising the steps of: heating the mass in a manner effective to establish a temperature gradient within the mass ranging from a temperature sufficient to produce vapors therefrom to a temperature below the condensation temperature of aluminum nitride; continuing the supply of heat to said mass to convert a portion of said particles into vapors and condensing the resultant vapors within the remaining solid particles, whereupon the resultant condensed nitride recrystallizes and acts as a binder to agglomerate the particles.

3. Process according to claim 2, wherein the heating is carried out in a closed container and in an atmosphere of nitrogen, and wherein the temperature at the upper level of said gradient is within the range of 2000°–2250° C.

4. Process of agglomerating a mass of aluminum nitride particles comprising the steps of: heating said mass in a nitrogen atmosphere to a temperature effective to sinter the particles; selectively heating a portion of said particles to convert them into vapors; contacting the vapors thus formed with the cooler unvaporized particles and thereby forming aluminum nitride thereon which, upon cooling and crystallization, acts as a binder and agglomerates the sintered mass.

5. As a novel product, a shaped refractory material consisting of sintered finely divided aluminum nitride particles and a recrystallized aluminum nitride binder, said product having been obtained by the process of claim 2.

References Cited in the file of this patent

UNITED STATES PATENTS

| | | |
|---|---|---|
| 1,060,509 | Serpek | Apr. 29, 1913 |
| 1,099,131 | Serpek | June 2, 1914 |
| 1,197,626 | Hershman | Sept. 12, 1916 |
| 2,091,569 | Ridgway et al. | Aug. 31, 1937 |
| 2,480,473 | Johnson | Aug. 30, 1949 |
| 2,511,216 | Miller | June 13, 1950 |
| 2,649,387 | Parsons et al. | Aug. 18, 1953 |
| 2,726,170 | Warf et al. | Dec. 6, 1955 |
| 2,728,128 | Sheer et al. | Dec. 27, 1955 |
| 2,808,314 | Taylor | Oct. 1, 1957 |